United States Patent
Nyström et al.

(10) Patent No.: US 8,699,947 B2
(45) Date of Patent: Apr. 15, 2014

(54) METHOD FOR DETERMINING THE RELATIVE POSITION OF DEVICES

(75) Inventors: Martin Nyström, Hörja (SE); Magnus Helgstrand, Södra Sandby (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 0 days.

(21) Appl. No.: 13/147,692

(22) PCT Filed: Sep. 3, 2010

(86) PCT No.: PCT/EP2010/062987
§ 371 (c)(1),
(2), (4) Date: Dec. 13, 2011

(87) PCT Pub. No.: WO2012/028210
PCT Pub. Date: Mar. 8, 2012

(65) Prior Publication Data
US 2013/0157721 A1    Jun. 20, 2013

(51) Int. Cl.
*H04B 5/00* (2006.01)
*H04B 5/02* (2006.01)

(52) U.S. Cl.
CPC ..................... *H04B 5/02* (2013.01)
USPC ........ 455/41.1; 455/90.1; 455/506; 455/66.1; 455/572

(58) Field of Classification Search
CPC ....................................................... H04B 5/02
USPC ................. 455/41.1, 90.1, 566, 66.1, 572
See application file for complete search history.

(56) References Cited

U.S. PATENT DOCUMENTS

| | | | |
|---|---|---|---|
| 6,684,176 B2 * | 1/2004 | Willins et al. | 702/150 |
| 6,922,184 B2 * | 7/2005 | Lawrence et al. | 345/156 |
| 6,940,405 B2 * | 9/2005 | Script et al. | 340/545.1 |
| 7,532,901 B1 * | 5/2009 | LaFranchise et al. | 455/456.6 |
| 8,060,112 B2 * | 11/2011 | Frank et al. | 455/456.1 |
| 8,068,925 B2 * | 11/2011 | McKillop et al. | 700/94 |
| 8,264,342 B2 * | 9/2012 | Blair et al. | 340/539.12 |
| 8,326,228 B2 * | 12/2012 | Lewis et al. | 455/67.11 |
| 2011/0086643 A1 * | 4/2011 | Kalayjian et al. | 455/445 |

FOREIGN PATENT DOCUMENTS

EP  1 296 155 A1   3/2003
WO  WO 2009/151666 A2  12/2009

OTHER PUBLICATIONS

International Search Report and Written Opinion dated May 31, 2011 issued in corresponding PCT application No. PCT/EP2010/062987, 12 pages.

* cited by examiner

*Primary Examiner* — Sanh Phu
(74) *Attorney, Agent, or Firm* — Snyder, Clark, Lesch & Chung, LLP

(57) ABSTRACT

The present invention relates to a method and arrangement for positioning at least two devices, a first and a second device relative each other. The method comprises: transmitting a number of magnetic pulses with the first device, detecting said pulses with the second device, based on said detected pulses generating a number of virtual planes, and determining a crossing line between said planes corresponding to a direction between said devices.

19 Claims, 4 Drawing Sheets

METHOD FOR DETERMINING THE RELATIVE POSITION OF DEVICES

TECHNICAL FIELD

The present invention relates to a method and arrangement for positioning in general and relative positioning in particular of two electrical devices.

BACKGROUND

Today, there exist many types of electronic devices such as mobile telephones, media players, palmtop computers etc. Such devices are often associated with a headset, i.e. a separate unit being arranged to be mounted on or close to a user's left or right ear. The headset normally comprises an earphone and a microphone for the output and input, respectively, of audio signals. Such audio signals are transmitted between the headset and the associated electronic device. Today, such a configuration is commonly used in the field of mobile telephones, in order to allow so-called "hands-free" operation of the mobile telephone.

In the case of mobile telephones, the headset is arranged so that the earphone is positioned close to a users ear and so that the microphone is positioned close to the users mouth. In order to position the headset in such a way, it normally comprises a so-called ear loop device, i.e. a generally annular element used in order to mount the headset on either the left or right ear of the user. According to known technology, a headset is normally provided with certain user interface ("man machine interface") functions, for example in the form of input controls for receiving user commands or making selections related to the operation of the device. For example, a headset can be provided with control buttons for increasing or decreasing the volume of the audio signal being fed to the earphone.

More complicated headsets may be provided with compass sensor, accelerometer and/or gyro.

A headset is just an example of an external unit which may be provided with sensors for detecting position and motion.

SUMMARY

The present invention provides for an arrangement and method for positioning two devices in general, and a mobile phone and a headset in particular, relative each other.

Example embodiments presented herein provide a method of positioning at least two devices, a first and a second device relative each other. The method comprises: transmitting a number of magnetic pulses with the first device, detecting said pulses with the second device, based on said detected pulses generating a number of virtual planes, and determining a crossing line between said planes corresponding to a direction between said devices. In one embodiment a first magnetic pulse has a known direction towards a reference direction known in both units. In another embodiment, a first magnetic pulse is parallel to a horizontal component of earth magnetic field. Preferably, a second magnetic pulse is a vertical pulse. The second device detects said first magnetic pulse and the detection is a well timed disturbance of earth magnetic field. From the second device's point of view, vectors describing the earth magnetic field and a resultant vector when said first pulse is active determines one plane contacting said first and second device. In one embodiment, the second device detects said second pulse and the detected disturbance by a sensor of the second device determines a vertical plane connecting said first and second devices. The crossing of said two planes constitutes a line between the devices. In one embodiment, a third magnetic pulse is transmitted to determine the direction along said line that points from the second device to said first device, said third pulse being transmitted along an estimated line with a known orientation of poles of the third magnetic pulse. The method may further comprise generating two or more magnetic vectors to determine one plane using two different coils with different length, one short coil and one long coil, parallel to each other, whereby said two coils in one point give different directed vectors, defining said plane. The method may further comprise using three perpendicular coils to construct one magnetic field using the three perpendicular coils by super-positioning, giving all coils a balanced amount of current, sending three orthogonal pulses in a sequence, said orthogonal pulses resulting in three vectors at measurement position, whereby if said three measured vectors are orthogonal, one of the coils is pointing towards the measurement point, and the opposite: if the measured vectors are not orthogonal, none of them point towards the measurement point.

The invention also relates to a device comprising a pulse generator for transmitting an electromagnetic pulse for carrying out the method according to above.

The invention also relates to a device comprising a magnetic sensor for detecting magnetic fields for carrying out the method according to above.

The invention also relates to a portable terminal comprising a display, a keypad, communication portion, a power source, a controller, a memory unit, a motion detecting sensor, characterized by a magnetic pulse generator. The magnetic pulse generator is configured to, e.g. upon instructions from the controller, to transmit magnetic pulses parallel to the horizontal component of earth magnetic field. The magnetic pulse generator comprises a coil and a power source. The portable terminal may comprise three perpendicular coils.

The invention also relates to a headset device, comprising a processing unit, audio processing units, earphone, microphone, radio transceiver and one or several sensors. The sensor comprises a magnetic sensor for detecting magnetic field. The sensor may function as a compass. The headset device may comprise accelerometer and/or gyro.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following the invention is described with exemplary reference to a mobile telephone and a headset for use with the mobile telephone. However, the invention may likewise be applied to other devices, such as portable DVD having viewing glasses, gaming terminals with hand consoles, a remote controlled device and a remote controller, etc.

Figure 1:
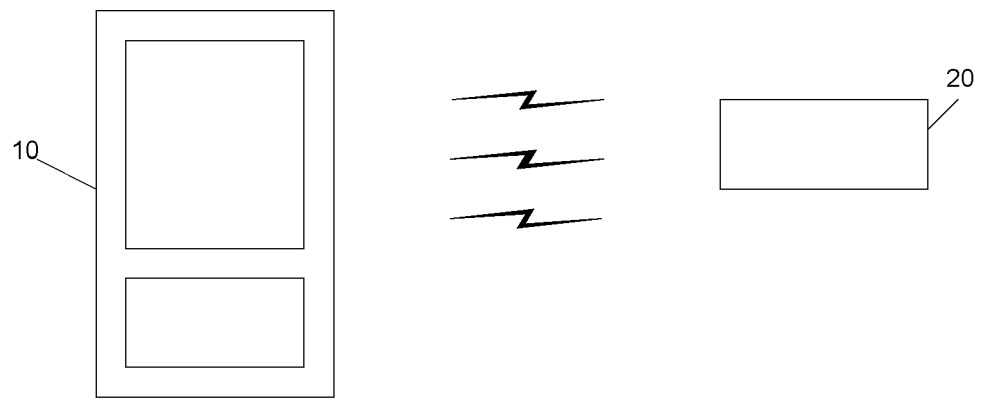
FIG. 1 is a schematic of a communication system according to example embodiments.

FIG. 1 illustrates schematically a portable terminal, according to this embodiment a mobile phone 10, and a device comprising direction and/or distance and/or position sensors, according to this embodiment a headset 20 for receiving and transmitting radio signals, for example corresponding to audio signals.

Figure 2:
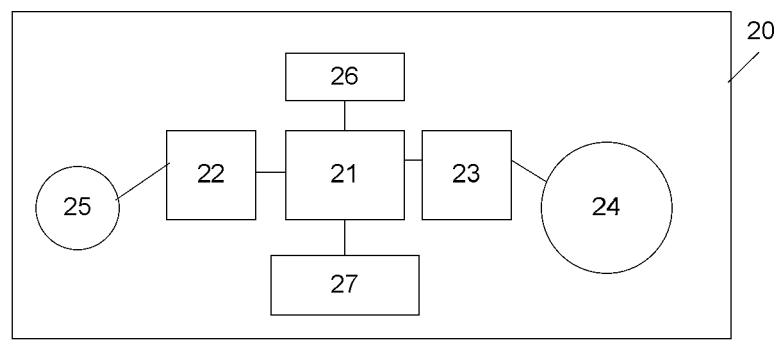
FIG. 2 is a block diagram of a headset apparatus according to example embodiments.

The headset 20 according to one embodiment is illustrated in FIG. 2 and comprises a processing unit 21, audio processing units 22 and 23, earphone 24, microphone 25, radio transceiver 26 and one or several sensors 27.

According to this example, the processing unit 21 controls the functions of the headset's different components. Audio processing unit 22 converts the signals from the microphone 25 to digital signals for transmission and the audio processing unit 23 converts the digital signals to audible signal provided to the earphone 24. The radio transceiver 26 may be a Bluetooth radio unit (or any other radio transceiver or infrared transceiver) which communicates with other devices, such as the mobile phone 10.

The sensor 27 may comprise a magnetic sensor, e.g. functioning as a compass. Other sensors such as accelerometer and/or gyro may also be incorporated into the headset.

It is clear that the functional units of the headset may vary depending on the type and demands. The different components and their functions described here are given merely as an example.

Figure 3:
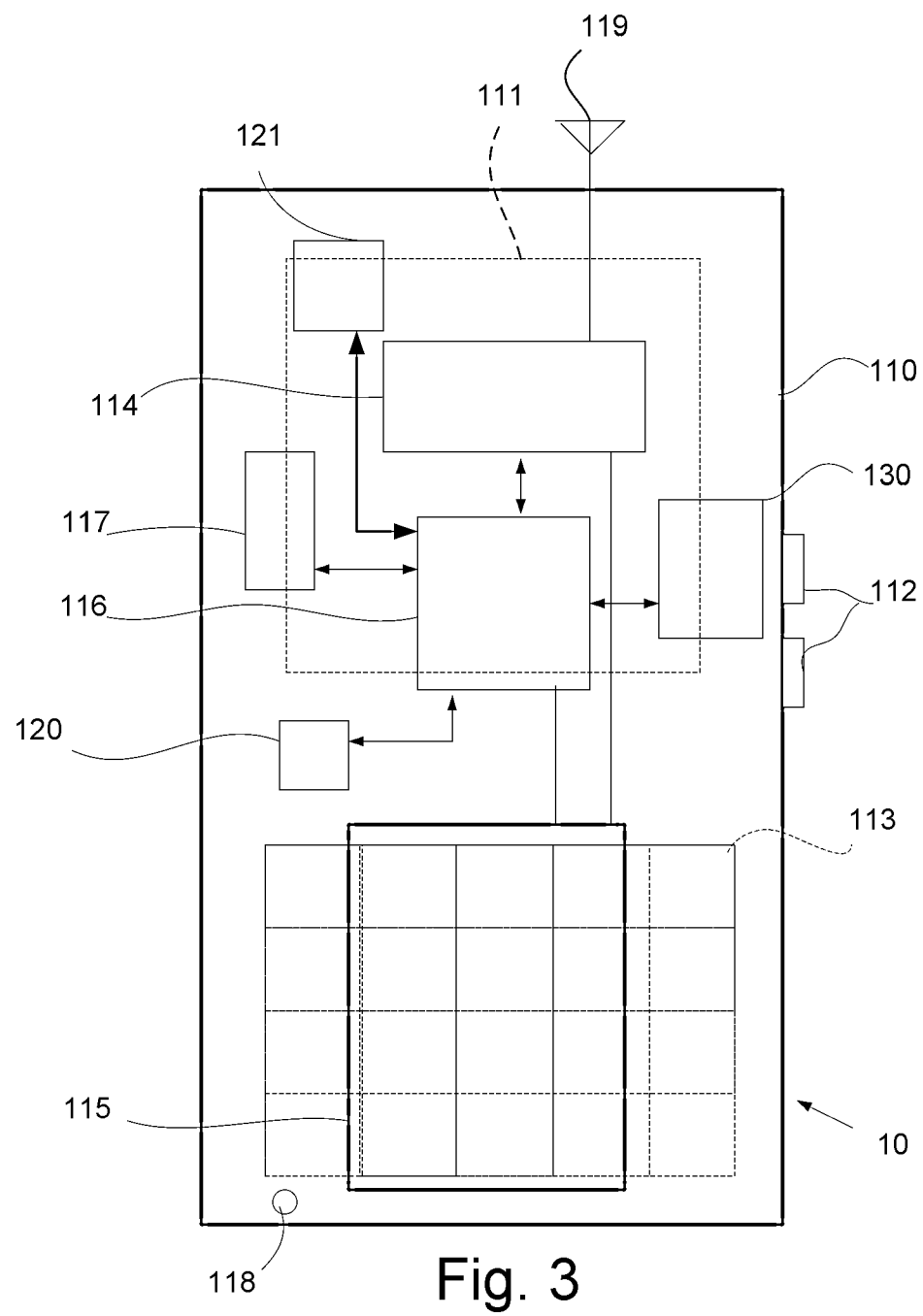
FIG. 3 is a block diagram of a mobile phone apparatus according to example embodiments.

FIG. 3 illustrates one exemplary embodiment of a communication device, such as a mobile phone, according to the invention.

As shown in FIG. 3, an exemplary device 10 may include a housing 110, a display 111, control buttons 112, a keypad 113 (physical or touch screen keypad), communication portion 114, a power source 115, a micro processor 116 (or data processing unit), a memory unit 117, a motion detecting sensor 120, such as an accelerometer, gyro and/or compass, and a microphone 118. The housing 110 may protect the components of device 100 from outside elements. Display 111 may provide visual information to the user. For example, display 111 may provide information regarding incoming or outgoing calls, media, games, phone books, the current time, a web browser etc. Control buttons 112 may permit the user to interact with device to cause device to perform one or more operations. Keypad 113 may include a standard telephone keypad. The motion detecting sensor 120 detects the motion of the device and may also enable applications such as commands input through gestures, indoor GPS functionality, game controls. The communication device may also comprise a GPS positioning portion 130, comprising additional antenna (or using the communication portion antenna) and GPS receiver. The microphone 118 is used to receive ambient sound, such as the voice of the user of the communication device or music. According to the invention the device further comprises a magnetic pulse generator 121, the function of which is further described below.

The communication portion comprises parts (not shown) such as a receiver, a transmitter, (or a transceiver), an antenna 119 etc., for establishing and performing communication with one or several communication networks and/or peripheral devices such as a headset as described in conjunction with FIG. 2.

The magnetic pulse generator 121 and transmitter is configured to, e.g. upon instructions from the controller 116, to transmit magnetic pulses, e.g. parallel to the horizontal component H (FIG. 4) of the earth magnetic field. This is best illustrated below.

The earth's magnetic field is a vector quantity; at each point in space it has a strength and a direction. To completely describe it three quantities are needed. These may be:
    three orthogonal strength components X, Y and Z;
    the total field strength F and two angles D and I; or
    two strength components: horizontal H and vertical Z and an angle D.

Figure 4:
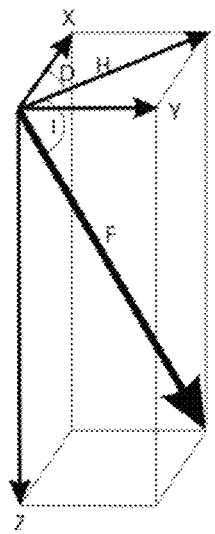
FIG. 4 is an explanatory diagram.

The relationship between these seven elements is shown in the diagram of FIG. 4.

Figure 5:
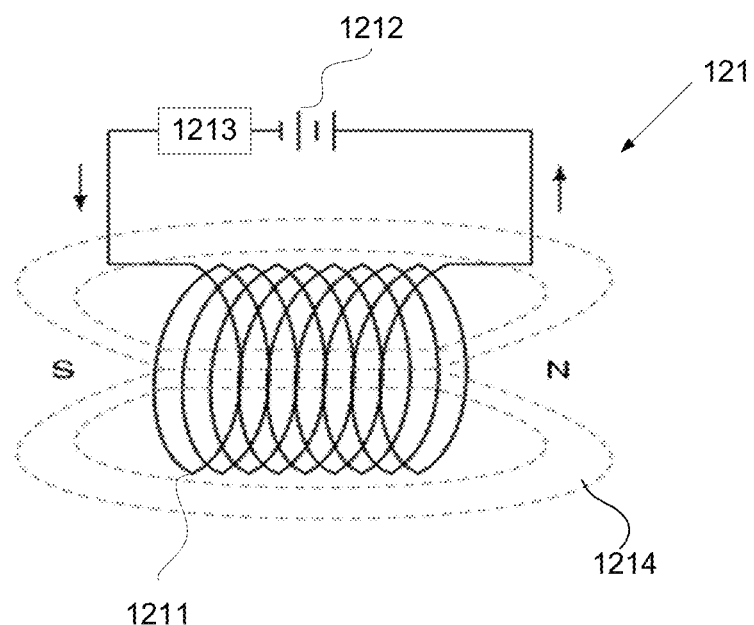
FIG. 5 is an illustrative example of a electromagnetic pulse generator.

FIG. 5 illustrates an exemplary simple magnetic pulse generator 121 comprising a coil 1211, a power source 1212 and possible control electronics 1213. The coil 1211 may have a suitable length and have a magnetic core (not shown). The pulse 1214 is generated by applying or varying the current in the coil 1211. The source may be a capacitor over the coil which is discharged to create high currencies from small unit. Also pulses may be applied to the coil.

The magnetic pulse transmitted by the phone device 10, e.g. using the device 121 of FIG. 5 is detected by the compass sensor or a magnetic sensor in the headset. The detection is a well timed disturbance of the earth magnetic field. Since the sending and receiving units are in signaling contact with each other or, the phone generating the pulses also may evaluate the responses from the sensors sent back from the headset, there may be a "time window" for coordinating pulse transmission and measurements, which increases accuracy.

The idea behind the positioning is that any measured disturbance vector is substantially in same plane as the source of the disturbing magnetic field. This is due to the closed magnetic field lines are rounded plane curves originating from the transmitting source and terminating in the same magnetic source. Anywhere along these lines the vector is in this plane, and two vectors will determine the plane.

Thus, two non-parallel planes give the crossing line between the sending and measuring units.

So any two planes, the first one including earth magnetic field and the vertical one, are only two examples for simple understanding of the invention.

Two vectors in one plane are needed to determine the plane. According to one example, these two vectors determining the first plane are the earth magnetic field and the disturbance vector from a magnetic field sent in parallel to earth magnetic field. The second two vectors determining the second plane are the vertical vector from gravity sensor, and the disturbance vector from a magnetic field sent vertically.

A second method to create two or more magnetic vectors to determine one plane may be to use one shorter coil and one longer coil, parallel to each other. These two coils will in one point give different directed vectors, defining the plane.

A third method may be to use three perpendicular coils, and construct one magnetic field using the three perpendicular coils by super-positioning, giving all coils a balanced amount of current. Then, the transmitted magnetic field may be directed arbitrary. Such a unit can send three orthogonal pulses in a sequence. The orthogonal pulses will result in three vectors at measurement position. If the three measured vectors are orthogonal, one of the virtual coils is pointing towards the measurement point, and the opposite: if the measured vectors are not orthogonal, none of them point towards the measurement point. By sending many triplets of orthogonal pulses in sequence, a "trial and error" method to find the direction towards the measurement point may be created.

Using mathematics and logics (e.g. LMS of orthogonality deviation), the sequence for sent orthogonal triplets may be minimized.

Figure 6:
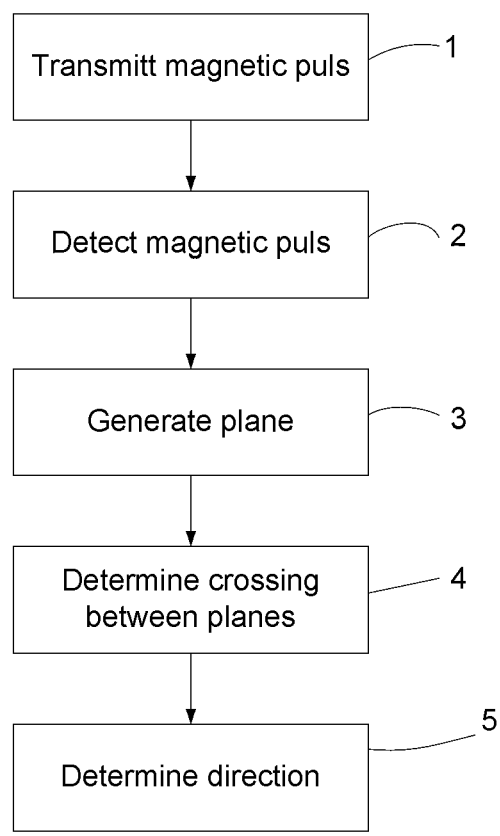
FIG. 6 is a block diagram over steps of an exemplary method according to the invention.

Thus, the fundamental method is to send magnetic pulses 1 (FIG. 6) in two or more directions, at least one parallel to earth magnetic field, to use a magnetic sensor to detect pulses 2 and logics to establish directions 5 between the transmitter and the receiver by determining 4 crossings between generated 3 planes.

Hence, from the headset point of view, the vectors describing the earth magnetic field and the resultant vector when the pulse is active will determine one plane contacting both the headset and the phone. Then the phone transmits a vertical pulse. The detected disturbance by the magnetic sensor of the headset determines a vertical plane connecting both the headset and the phone. The accelerometer sensor in the headset, which senses the gravity, may be used to determine the vertical position.

The crossing of the two planes constitutes a line between the phone and the headset, living just two possible directions from the headset to the phone.

To determine the direction along the line that points from the headset to the phone, a third magnetic pulse is transmitted from the phone, which is a pulse along the estimated line with a known orientation of the poles of the pulse. Based on these determinations, the direction towards the phone seen from the headset may be determined.

The described processes are examples of determining direction between the headset and the phone using three magnetic pulses. In reality, any three orthogonal magnetic pulses are possible to use or transform for achieving direction determination. It is possible to handling singularities by tuning the pulses.

A singularity, for example, in the above first example is if a pulse is sent parallel to the earth magnetic field. If at reception the disturbance vector also is along the earth magnetic field these two vectors cannot determine a plane. It has to be an angle between the two vectors to determine a plane. The information after this first measurement is that the sending and measuring units are side by side, somewhere in a plane perpendicular to the earth magnetic field. However, there is no information about their relative positions in this plane. One method to handle this singularity is to send a rotating magnetic field perpendicular to the first one (perpendicular towards earth magnetic field). At a specific sending angle there is a vertical vector measured at the receiver, directed up or down. Some rotation later, there is a second vertical vector measured at the receiver, this time directed opposite towards the first. Thus, a symmetry solution is established. The angle in the middle of the two angles giving vertical vectors is the direction between sender and receiver.

The pulses do not need to have same strength as the earth magnetic field. They do only need to be strong enough for the receiving sensor to measure a well defined disturbance of the earth magnetic field.

In one exemplary embodiment, the pulses are low-pass filtered to avoid unnecessary induction.

The outputs of the sensors in the headset are transmitted to the phone, e.g. using RF, so the pulse generator is configured to time the measurements and may also optimize next pulses based on the prior measurements.

The phone may be configured to transmit signals to the headset before each magnetic pulse is transmitted so that the headset can be ready for detecting the pulse.

The system is not limited to three orthogonal pulses. A series of optimized pulses may enhance performance.

The distance between the headset and phone may be determined to some extent, since the magnetic field strength from a short coil is proportional to the square of the distance.

The magnetic field of the earth may be disturbed. For example, the earth magnetic field may vary indoors due to disturbances from electrical devices and magnetic material based constructions, etc. This may be remedied by, for example:

1) The vertical component of the earth magnetic field, (i.e. the stationary magnetic field) can be measured by the gravity sensing accelerometer of the phone. If the vertical component is different in the phone and in the headset, this can be compensated for (see above examples).
2) The strength of the stationary magnetic field is measured by the sensors in the phone and the headset simultaneously. If the strength differs, there is a disturbance.

Thus, in one embodiment each unit, both phone and headset, is provided with gravity sensing accelerometers to establish vertical and horizontal component of earth magnetic field. In this condition the first proposed method to find two vectors in each plane might not be reliable.

It may also be possible to calibrate the measurements for the differences.

Methods for control or to be used in cumbersome magnetic conditions:

1) Sending directed pulses towards estimated direction of headset. The measured disturbance of magnetic field at reception shall be in the estimated direction. If not, the estimation is not perfect. As mentioned earlier, a set of three orthogonal coils gives three components. The components are individually controllable by the current in the corresponding coil. At a short distance from this set of coils, only the resultant of these three components is measurable, and that is the directed pulse.
2) Sending directed pulses of different strength towards estimated direction of headset. At reception, these pulses will only give difference in received strength, not in angle. If there is an angle difference measured, the measurement and estimation is not correct.
3) There are more advanced mathematical methods utilizing the shape of the magnetic field around a coil, so a known minor deviation in the magnetic directivity of sent field gives a known change in the direction of measured field. The ratio of sent to received angular deviation is known, and dependent on position in magnetic field.

As mentioned earlier, the present invention is not limited for applications in a mobile phone. Other systems and devices may likewise employ the teachings of the invention in various applications, such as:

Positioning goggles in gaming or virtual reality systems: the computer transmits magnetic pulses and goggles detect the transmitted pulses, Positioning markers in a motion capturing/analyzing system: motion capturing device (camera) transmits magnetic pulses and markers detect the transmitted pulses, Positioning media plying device and headset/Monitor/eye glasses, Etc.

The present invention has many advantages and applicable areas. Specially but not exclusively, when used in mobile phone applications:

When a call signal is transmitted to a stereo headset, the signal can be audible from the phones position, in such way that a virtually constructed 3D sound effect can be realized, so that the user perceive the ring signal from the phone, If a user having headset is not looking at the display of the phone, it is detected and the display may be turned off for saving power, 3D audio of a movie played from the phone will be virtually constructed to follow the phone position, The various embodiments of the present invention described herein is described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

A "device" as the term is used herein, is to be broadly interpreted to firstly include a magnetic pulse generator arrangement and magnetic sensors and also may include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A method of positioning at least two devices, a first and a second device, relative each other, the method comprising:
    transmitting a number of magnetic pulses with the first device,
    detecting said pulses with the second device, wherein the second device comprises a magnetic sensor, and wherein the detecting comprises detecting a disturbance in the earth magnetic field,
    based on said detected pulses generating a number of virtual planes, and
    determining a crossing line between said planes corresponding to a direction between said devices.

2. The method of claim 1, wherein a first magnetic pulse, of the number of magnetic pulses, has a known direction towards a reference direction known in the two devices.

3. The method of claim 1, wherein a first magnetic pulse, of the number of magnetic pulses, is parallel to a horizontal component of the earth magnetic field.

4. The method of claim 3, wherein a second magnetic pulse, of the number of magnetic pulses, is a vertical pulse.

5. The method of claim 4, wherein the second device detects said first magnetic pulse and the detecting the disturbance includes detecting a well-timed disturbance of the earth magnetic field.

6. The method of claim 5, wherein from a point of view of the second device, vectors describing the earth magnetic field and a resultant vector when said first pulse is active determine a first plane contacting said first and second devices.

7. The method of claim 5, wherein said second device detects said second pulse and the detected disturbance by the magnetic sensor of the second device determines a vertical plane connecting said first and second devices.

8. The method of claim 7, wherein the crossing of the first plane and the vertical plane constitutes a line between the devices.

9. The method according to claim 7, wherein a third magnetic pulse, of the number of magnetic pulses, is transmitted to determine the direction along said line that points from the second device to said first device, said third pulse being transmitted along an estimated line with a known orientation of poles of the third magnetic pulse.

10. The method according to claim 1, further comprising:
    generating two or more magnetic vectors to determine one plane by using two different coils with different lengths, one short coil and one long coil, parallel to each other, whereby said two coils in one point give different directed vectors defining said one plane.

11. The method according to claim 1, further comprising:
    using three perpendicular coils to construct one magnetic field by super-positioning, giving all coils a balanced amount of current, and sending three orthogonal pulses in a sequence,
    wherein said orthogonal pulses result in three vectors at a measurement position,
    whereby if said three measured vectors are orthogonal, one of the coils is pointing towards the measurement position and if the measured vectors are not orthogonal, none of them point towards the measurement position.

12. A portable device configured to communicate with a terminal and comprising:
    a processing unit;
    at least one magnetic sensor configured to detect a number of magnetic pulses, from the terminal, corresponding to disturbance of the earth magnetic field;
    wherein said processing unit is configured to:
        based on said detected magnetic pulses, generate a number of virtual planes,
        determine a crossing line between said virtual planes and corresponding to a direction between said portable device and said terminal, and
        generate a signal, in response to the detection of said magnetic pulses, that provides a position of said portable device relative to said terminal.

13. A portable terminal comprising
    a display,
    a keypad,
    a communication portion, a power source,
a memory unit,
a motion detecting sensor, and
a magnetic pulse generator, configured to generate a magnetic pulse that causes a disturbance in the earth magnetic field and is detected by a device configured to detect the magnetic pulse;
generate a number of virtual planes based on the detected matnetic pulse;
determine a crossing line, between said planes, corresponding to a direction between the portable terminal and the device; and:
generate a signal, in response to detecting the magnetic pulse, that indicates a position of the device relative to the portable terminal.

14. The portable terminal of claim 13, further comprising a controller,
wherein said magnetic pulse generator is configured to, upon receiving instructions from the controller, transmit magnetic pulses parallel to the horizontal component of the earth magnetic field.

15. The portable terminal of claim 13, wherein said magnetic pulse generator comprises a coil and a power source.

16. The portable terminal of claim 13, comprising three perpendicular coils.

17. A headset device, comprising
a processing unit,
audio processing units,
earphone,
microphone,
radio transceiver and
at least one magnetic sensor configured to detect a number of magnetic pulses, from a transmitter, corresponding to disturbance of the earth magnetic field;
wherein said processing unit is configured to:
based on said detected magnetic pulses, generate a number of virtual planes,
determine a crossing line, between said planes, corresponding to a direction between the headset device and a transmitter,
generate a signal, in response to detection of said magnetic pulses, that indicates a position of said headset device relative to said transmitter.

18. The headset device of claim 17, further comprising a sensor that functions as a compass.

19. The headset device of claim 17, comprising an accelerometer or a gyro.

* * * * *